United States Patent [19]

Toyama

[11] Patent Number: 4,614,974

[45] Date of Patent: Sep. 30, 1986

[54] RANGE FINDING SYSTEM SUITED FOR VIDEO CAMERA

[75] Inventor: Masamichi Toyama, Tokyo, Japan

[73] Assignee: Canon Kabushiki Kaisha, Tokyo, Japan

[21] Appl. No.: 706,602

[22] Filed: Feb. 28, 1985

[30] Foreign Application Priority Data

Feb. 29, 1984 [JP] Japan .................................. 59-37622

[51] Int. Cl.⁴ .......................................... H04N 5/232
[52] U.S. Cl. .................................................. 358/227
[58] Field of Search .................. 358/227, 41; 354/402, 354/403, 408

[56] References Cited

U.S. PATENT DOCUMENTS

| | | | |
|---|---|---|---|
| 4,247,187 | 1/1981 | Tamura | 354/408 |
| 4,333,717 | 6/1982 | Tamura | 354/408 |
| 4,483,613 | 11/1984 | Yokota | 354/403 |
| 4,529,304 | 7/1985 | Ogawa et al. | 354/403 |
| 4,533,241 | 8/1985 | Masunaga et al. | 354/403 |
| 4,550,995 | 11/1985 | Toyama | 358/227 |
| 4,561,746 | 12/1985 | Matsuda et al. | 354/403 |

Primary Examiner—Gene Z. Rubinson
Assistant Examiner—Stephen Brinich
Attorney, Agent, or Firm—Toren, McGeady, Stanger, Goldberg & Kiel

[57] ABSTRACT

A range finding system suited for a video camera comprising range detection means for projecting a radiation beam toward an object and receiving a reflected beam coming from the object to detect the object distance, means for generating, on the basis of an image signal of the object, a compensation signal depending upon the radiation reflecting condition of that portion of the object which is irradiated by the radiation beam, and means responsive to this compensation signal for giving compensation to a detection signal of the range detection means.

20 Claims, 5 Drawing Figures

FIG.4
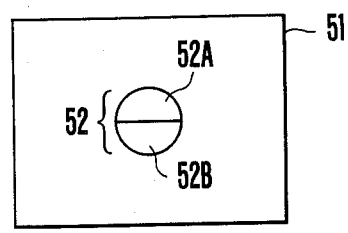
FIG.5
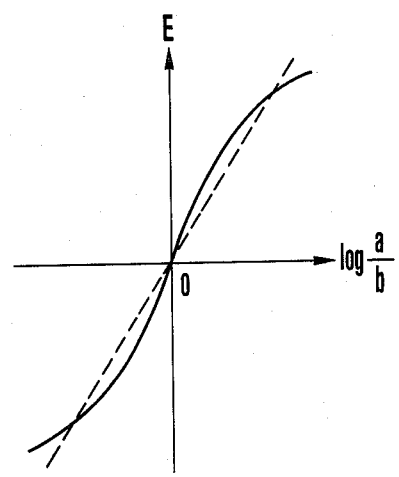
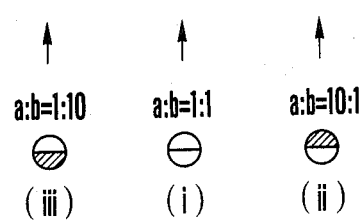

RANGE FINDING SYSTEM SUITED FOR VIDEO CAMERA

BACKGROUND OF THE INVENTION

1. Field of the Invention:

This invention relates to range finding systems, and more particularly to a range finding system of the so-called radiation beam projection type in which a radiation beam is projected toward an object, and the object distance is detected on the basis of the reflected radiation beam coming from the object.

2. Description of the Prior Art:

In the apparatus having a radiation projector by which a near infrared light is projected toward an object and a light sensor arranged in a base length from the projector to receive the reflected light, thereby the distance to the object is detected and the focus detection of a picture-taking lens, or furthermore its automatic focusing adjustment is performed, if the portion of the object which is irradiated by the projected light does not have a uniform distribution of reflection for the near infrared light (hereinafter sometimes called "contrast pattern"), a range finding error will be produced because the center of gravity of the reflected light deviates from the center of the reflected light beam.

To compensate this range finding error due to the contrast pattern, the following methods are considered. One of them as employed in the system of the type in which the reflected light is received by a pair of light sensors and their outputs are compared with each other to detect the distance, is to use an additional pair of such light sensors in combination with a subtractor for producing an output representing the difference between the differential outputs of the two pairs of sensors. Because the use of this method doubles the circuit scale, there are disadvantages in the electrical power, assembling size, compactness, the number of adjusting operations and cost. Another method as employed in the system of the type described, is to utilize the difference between the ones of the outputs of the two sensors which are produced when the projector such as a light-emitting diode, gives off no light. As the available lights range from the sun light of constant intensity to artificial lights of alternating intensities from illuminating devices supplied with current from the commercial power source, and further have a wide range of wavelengths, the dynamic range is found to be insufficient. Therefore it is difficult to put the method to practice.

Another problem of these methods is that as the size of the field of view of the sensor generally amounts to about 10 times that of the area of the radiation projection spot, the contrast of the portion which is irrelevant to the range finding is detected, thereby the contrast ratio and the range finding error are increased in magnitude.

SUMMARY OF THE INVENTION

An object of the present invention is to provide a system, particularly a range finding system of the radiation beam projection type which has overcome the above-described problems and is able to detect the distance with a higher accuracy.

Another object of the present invention is to provide a range finding system of the radiation beam projection type suited particularly for video cameras with means of simple structure utilizing the video signal for compensating the range finding error attributable to the radiation reflecting condition of the object.

Under such objects, according to an embodiment embodying one of the aspects of the present invention, the range finding system, particularly the range finding system of the radiation beam projection type suited for a video camera comprises range detection means for projecting a radiation beam toward an object and receiving a reflected beam to detect the distance to the object, means for forming, on the basis of an image signal of the object, a compensation signal depending upon the radiation reflecting condition of that portion of the object which is irradiated with the radiation beam, and means responsive to the compensation signal for applying compensation to a detection signal of said range detection menas.

Thus, in the range finding system of the invention, the compensation signal depending upon the radiation reflecting condition of the object is made obtainable from the image signal of the object, giving an advantage of constructing the system in simple form. Another advantage is that without having to extend the available dynamic range, that component of the range finding error which is attributed to the radiation reflecting condition of the object is well compensated for the possibility of performing distance detection always with high accuracy.

Other objects, aspects and features of the invention will become apparent from the following description of an embodiment thereof by reference to the accompanying drawings.

BRIEF DESCRIPTION OF THE DRAWINGS

The present invention will next be described in connection with a preferred embodiment by reference to the accompanying drawings in which:

FIG. 4 is a plan view illustrating a radiation projecting area in the field of view of the finder of FIG. 1.

FIG. 5 is a graph illustrating the relationship between the range finding error and the compensation signal.

DETAILED DESCRIPTION OF THE EMBODIMENT

Figure 1:
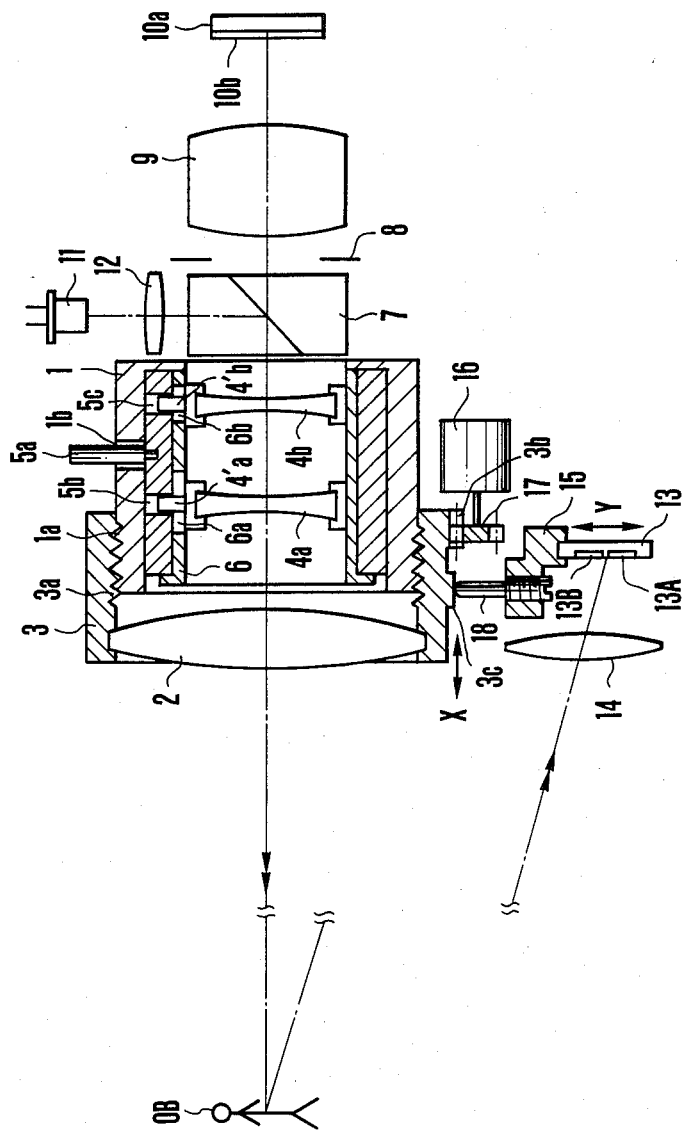
FIG. 1 is a sectional view of optical and mechanical systems of an embodiment of the invention.

At first, referring to FIG. 1, OB is an object; 2 is a focusing lens and 3 is a helicoid ring with its inner surface having a helicoid thread 3a meshing with a helicoid screw 1a in the outer periphery of a fixed barrel 1 and with its outer surface provided with a gear 3b and also formed with a cam 3c. 4a is a variator lens, 4b is a compensator lens, and 5 is a zoom cam ring rotatably fitted in the inner surface of the fixed barrel 1 and restrained from axial movement. The zoom cam ring 5 has an actuator rod 5a radially extending through a slot 1b of the fixed barrel 1. A lens guide sleeve 6 is provided inside the cam ring 5 and is connected to the fixed barrel 1. Follower pins 4'a and 4'b provided on lens holders for the lenses 4a and 4b extend through respective guide slots 6a and 6b of the guide sleeve 6 into cam slots 5b and 5c of the cam ring 5 respectively. 7 is a beam splitter having a dichroic mirror, 8 is a diaphragm, and 9 is a relay lens. These optical elements are arranged and operate in a manner known in the art of zoom lenses, and therefore their explanation is no more given here.

10a is an image pick-up element which may be either an image pick-up tube or a solid state image pick-up element, but in the following description is assumed to be a single image pick-up tube of the three-electrode type. 10b is a color stripe filter for the image pick-up element 10a.

11 is a light emitting diode (LED) as an example of a light source for projecting a radiation beam toward the object OB, 12 is a light projection lens, and 13 is a photo-diode (PD) as an example of a light sensor for receiving the reflected light coming from the object OB. The photo-diode 13 is constructed from two sensor sections 13A and 13B of the image receiving surface. 14 is a collection lens and 15 is a holder for the photo diode 13.

16 is a motor and 17 is a pinion connected to an output shaft of the motor 16 and meshing with the gear 3b provided on the outer periphery of the helicoid ring 3. 18 is a drive connection pin screw-threadedly mounted on the holder 15 of the photo diode 13 and abutting on the cam 3c formed on the outer periphery of the helicoid 3.

Figure 2:
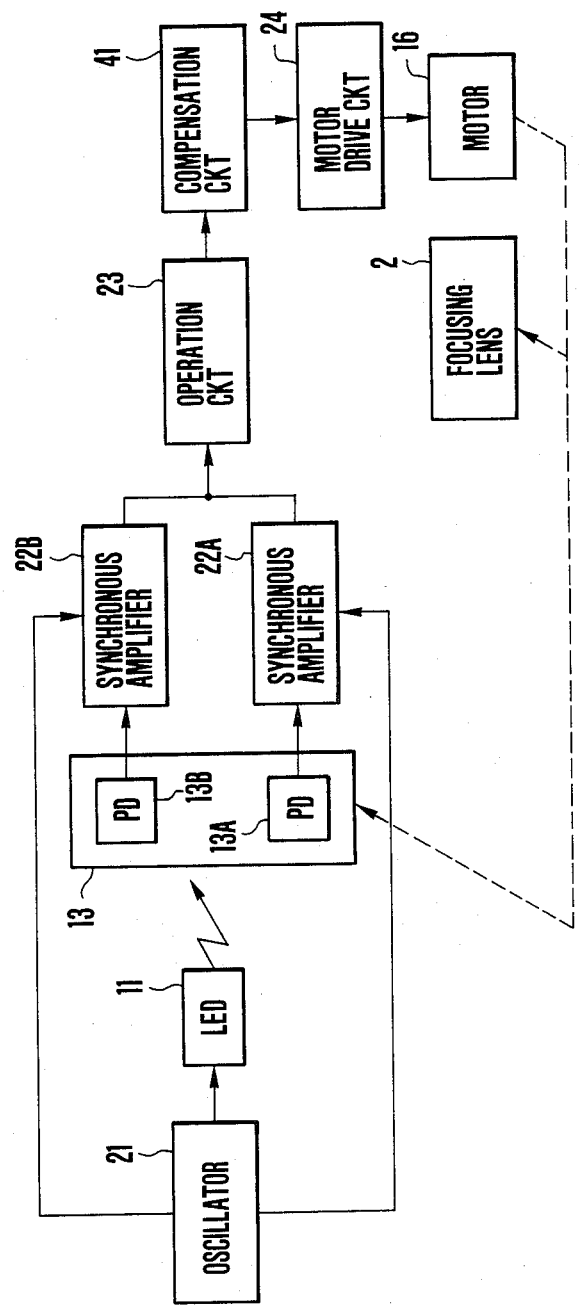
FIG. 2 is a block diagram of an electrical circuit system usable with the systems of FIG. 1.

In FIG. 2, 21 is an oscillator for driving the light-emitting diode 11 to light on and off with a prescribed frequency, and 22A and 22B are synchronous amplifiers for synchronously detecting the outputs of the sensor sections 13A and 13B of the photo-diode 13 respectively. The amplifiers 22A and 22B are synchronously controlled together with the light emitting diode 11 by the output of the oscillator 21. 23 is an operation circuit for producing a range detection signal from the outputs of the synchronous amplifiers 22A and 22B. As the range detection signal use may be made of a signal representing $(A'-B')/(A'+B')$ where A' and B' are the outputs of the sensor sections 13A and 13B respectively, for example. 41 is a compensation circuit for forming a signal for compensating a range detection error due to the contrast pattern of the object OB. The construction and operation of the compensation circuit 41 will be later described in detail by reference to FIGS. 3 to 5. The range detection signal after compensated by the compensation signal formed by the compensation circuit 41 is applied through a motor drive circuit 24 to rotate the motor 16 in a forward or reversed direction, thereby the helicoid ring 3, and, therefore, the focusing lens 2 is axially moved as shown by a two-headed arrow X in FIG. 1 for focusing. As such focusing goes on, the photo-diode 13 is moved vertically as shown by a two-headed arrow Y in FIG. 1 through the pin 18 and cam 3c until the compensated range detection signal by the compensating circuit 41 is reduced to substantially zero.

Figure 3:
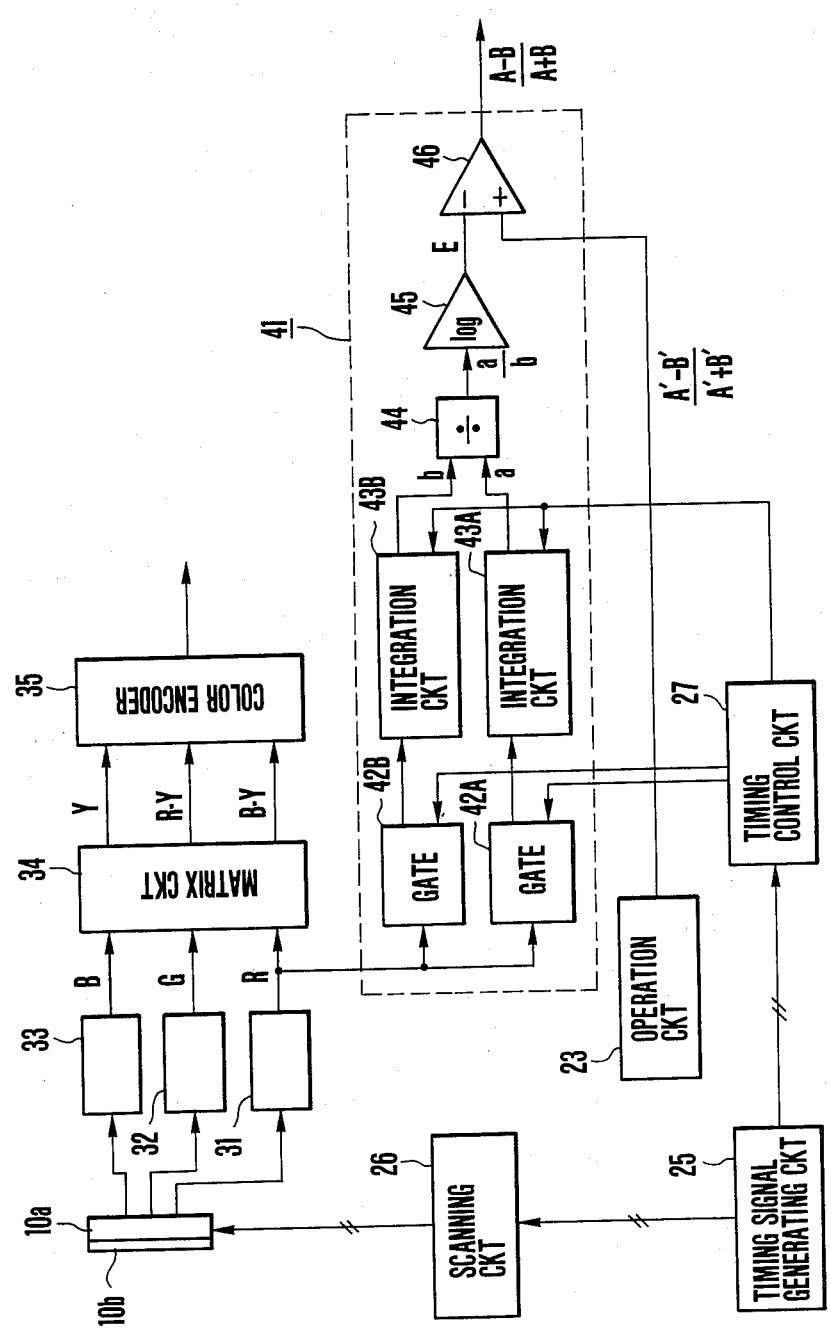
FIG. 3 is a block diagram illustrating the details of the compensation circuit of FIG. 2 along with a video signal processing circuit.

FIG. 3 illustrates the compensation circuit 41 associated with a video signal processing circuit of the video camera so that the compensation signal depending on the contrast pattern can be obtained from the video signals. In the drawing, the three-electrode color image pick-up tube as the image pick-up element 10a is provided with electrodes corresponding to colored filter portions of R, G and B of the stripe filter 10b. As is well known, the image pick-up tube 10a is scanned by a scanning circuit 26 on the basis of timing signals from a timing signal forming circuit 25. And, by process amplifiers 31, 32 and 33 connected to the R, G and B electrodes are formed R, G and B color signals. A luminance signal Y is obtained by these R, G and B color signals and color-difference signals R-Y and B-Y are produced by a matrix circuit 34. Then, color encoder 35 produces a composit color video signal which is applied to an output device such as a recoder or display.

Here, FIG. 4 illustrates a picture-taking view-field 51 and a radiation projecting area 52 within the same view-field 51. The radiation projecting area 52 depends upon the size of projected light spot on the object OB and the focal length of the picture-taking lens, but with the optical system of the TTL radiation projection type shown in FIG. 1, despite zooming, the relationship of the radiation projecting area 52 to the view-field 51 remains constant.

The radiation projecting area 52 is divided into such two parts 52A and 52B as to optically correspond to the two sensor sections 13A and 13B of the photo-diode 13 respectively. To select the R-signal from these parts 52A and 52B, there are provided gate circuits 42A and 42B of FIG. 3. These gate circuits 42A and 42B are controlled by a timing control circuit 27 on the basis of the timing signals from the timing signal generating circuit 25. The outputs of the gate circuits 42A and 42B are integrated by respective integration circuits 43A and 43B respectively. After that, based on their integration outputs "a" and "b", a divider 44 produces an output signal representing a/b as a function of contrast. Then, k.log(a/b), where k is constant, is produced by a logarithmic amplifier 45. This value may be regarded as approximately proportional to the range detection error as will be described more fully later, and is usable as the above-mentioned compensation signal. Then, by a subtractor 46, the output of the operation circuit 23 or the range detection signal, is compensated by this compensation signal. The motor 16 is therefore controlled on the basis of this compensated range detection signal $(A-B)/(A+B)$ as has been stated above. The integration circuits 43A and 43B are reset in a prescribed timing by the timing control circuit 27.

Next, by reference to FIG. 5, the range detection error due to the contrast pattern is explained. In the graph, the ordinate represents the range detection error E, and the abscissa represents log(a/b). In a case (i) where the signals "a" and "b" obtained from the sensor sections 13A and 13B are equal to each other, in other words, the object has no contrast, any range detection error is not produced. In another case (ii) where the signal "a" is 10 times as large as the signal "b", a range detection error is produced as shown by a solid curve in FIG. 5. In a third case (iii), or the reversed case of case (ii), where the signal "a" is 1/10 times as large as the signal "b", an equal range detection error to case (ii) but of opposite sign occurs. As will be understood from the graph, the relationship between E and log(a/b) cannot be expressed by a simple equation, but can be approximated by a primary equation as shown by a dashed line in the actual practice to obtain a sufficient effect. In the above-described embodiment, therefore, E is assumed to vary as a linear function of log(a/b). Also the above-defined proportional constant k may be taken at a small value for the emphasis on that range detection error which is responsive to a large pattern of contrast, or at a large value for the emphasis on that range detection error which is responsive to a small pattern of contrast. For most of the picture-taking situations, however, it has been proven that a good result is obtained when the value of k is so chosen as to attain a compensation for a contrast of a:b=4:1.

Since the magnitude of the R-signal varies at a high rate with the reflection index for the near infrared light, the contrast error can be effectively removed, if the above-described compensation signal is formed on the basis of the R-signal out of the outputs of the image pick-up tube 10a.

In FIG. 3, because the integration period of the integration circuits 43A and 43B can take any large value independently of the synchronous amplifiers 22A and 22B and the operation circuit 23 without involving any serious problem of the response characteristics in the actual practice, it is possible to detect a signal representing the contrast ratio even when the illumination of the object OB is low. Conversely when the illumination of the object OB is bright, the integration period can be shortened and, moreover, the diaphragm 8 is stopped down as is controlled by a control circuit (not shown). Therefore, the dynamic range of the compensation circuit 41 never becomes insufficient.

To further remove that part of the range detection error which is affected by the periodical fluctuation of the illumination (for example, with the fluorescent lamp of 50 or 60 Hz), the integration period of the integration circuits 43A and 43B may be set between 300 and 500 msec. Also in this embodiment, the contrast detecting system (10a, 41) is arranged to operate independently of the range finding system (11, 13, 21, 22A, 22B of FIG. 1). Therefore, performance of the contrast error detecting operation does not cause delay of the focus detecting operation. This is advantageous in the point of view of the response characteristics.

Though the embodiment of FIGS. 1 to 3 has been described in connection with the range detection signal in the form of $(A-B)/(A+B)$ and the range detection error signal in the form of $\log(a/b)$, it is also possible to use other forms of the range detection signal and the compensation signal representing the range detection error when the invention is put into practice. Also, every optical element, circuit or device of the FIGS. 1 to 3 may be replaced by any other desired similar means known in the art. For example, as the image pick-up element, instead of the above-mentioned three-electrode single image pick-up tube, it is also possible to use any other type image pick-up tubes, or one or more solid state image pick-up elements.

In application of this invention to black and white video cameras, the aforesaid compensation signal is formed necessarily on the basis of the luminance signal in place of the aforesaid R-signal. Though this more or less sacrifices the correlation with the near infrared light, a sufficiently effective compensation can be carried out.

What is claimed is:

1. A range finding system comprising:
   (a) range detection means of a radiation beam projection type which projects a radiation beam toward an object and detects the object distance on the basis of the reflected radiation beam coming from the object;
   (b) image signal generation means for generating an image signal of the object;
   (c) compensation signal generation means for generating, on the basis of the image signal generated by said image signal generation means, a compensation signal depending upon the radiation reflecting condition of a portion of the object on which the radiation beam projected by said range detection means impinges; and
   (d) compensation means for compensating a detection signal of said range detection means with the compensation signal generated by said compensation signal generation means.

2. The system according to claim 1, wherein said range detection means is arranged to project a radiation beam of a predetermined characteristic; said image signal generation means is arranged to generate an image signal including a signal component representing a radiation which has a characteristic approximated to that of the radiation beam projected by said range detection means; and said compensation signal generation means is arranged to generate said compensation signal on the basis of said signal component of the image signal generated by said image signal generation means.

3. The system according to claim 2, wherein said characteristic includes a wave length of the radiation.

4. The system according to claim 3, wherein said range detection means is arranged to project an infrared beam; said image signal generation means is arranged to generate the signal component representing red light; and said compensation signal generation means is arranged to generate the compensation signal on the basis of the signal component representing the red light.

5. The system according to claim 1, wherein said compensation signal generation means includes;
   signal gate means;
   gate control means for causing said gate means to select from the image signal a signal portion substantially corresponding to the portion of the object on which the radiation beam projected by said range detection means impinges; and
   circuit means for producing said compensation signal by processing the signal portion selected by said gate means.

6. A video camera comprising:
   (a) a focus adjustable lens system for forming an image of an object;
   (b) image pick-up means for producing an image signal representing the object image;
   (c) an automatic focusing system of a radiation beam projection type which projects a radiation beam toward the object and automatically focuses said lens system on the object on the basis of the reflected radiation beam coming from the object;
   (d) compensation signal generation means for generating, on the basis of the image signal generated by said image pick-up means, a compensation signal depending upon the radiation reflecting condition of a portion of the object on which the radiation beam projected by said focusing system impinges; and
   (e) compensation means for compensating a focus detection signal of said focusing system with the compensation signal generated by said compensation signal generation means.

7. The camera according to claim 6, wherein said focusing system is arranged to project a radiation beam of a predetermined characteristic; said image pick-up means is arranged to generate an image signal including a signal component representing a radiation which has a characteristic approximated to that of the radiation beam projected by said focusing system; and said compensation signal generation means is arranged to generate said compensation signal on the basis of said signal component of the image signal generated by said image pick-up means.

8. The camera according to claim 7, wherein said characteristic includes a wave length of the radiation.

9. The camera according to claim 8, wherein said focusing system is arranged to project an infrared beam; said image pick-up means is arranged to generate the signal component representing red light; and said compensation signal generation means is arranged to generate the compensation signal on the basis of the signal component representing the red light.

10. The camera according to claim 6, wherein said compensation signal generation means includes:
 signal gate means;
 gate control means for causing said gate means to select from the image signal a signal portion substantially corresponding to the portion of the object on which the radiation beam projected by said focusing system impinges; and
 circuit means for producing said compensation signal by processing the signal portion selected by said gate means.

11. A range finding system comprising:
 (a) range detection means of a light beam projection type which projects a light beam toward an object and detects the object distance on the basis of the reflected light beam coming from the object, said detection means including a light sensor with a pair of sensing sections and detecting the distance by the comparison of output signals of the sensor sections;
 (b) image signal generation means for generating an image signal of the object;
 (c) compensation signal generation means for generating, on the basis of the image signal generated by said image signal generation means, a compensation signal depending upon the difference in light reflecting conditions of two portions of the object which are illuminated with the light beam projected by said range detection means and substantially correspond to the fields of view of the sensor sections of said light sensor, respectively; and
 (d) compensation means for compensating a detection signal of said range detection means with the compensation signal generated by said compensation signal generation means.

12. The system according to claim 11, wherein said range detection means is arranged to project a light beam of a predetermined characteristic; said image signal generation means is arranged to generate an image signal including a signal component representing a light component which has a characteristic approximated to that of the light beam projected by said range detection means; and said compensation signal generation means is arranged to generate said compensation signal on the basis of said signal component of the image signal generated by said image signal generation means.

13. The system according to claim 12, wherein said characteristic includes a wave length of the light.

14. The system according to claim 13, wherein said range detection means is arranged to project an infrared beam; said image signal generation means is arranged to generate the signal component representing red light; and said compensation signal generation means is arranged to generate the compensation signal on the basis of the signal component representing the red light.

15. The system according to claim 12, wherein said compensation signal generation means includes;
 signal gate means;
 gate control means for causing said gate means to select from the signal component of the image signal a signal component portions substantially corresponding to the portions of the object which are illuminated by the light beam projected by said range detection means and substantially correspond to the fields of views of the sensor sections of said light sensor, respectively; and
 circuit means for producing said compensation signal by processing the signal component portions selected by said gate means.

16. A video camera comprising:
 (a) a focus adjustable lens system for forming an image of an object;
 (b) image pick-up means for producing an image signal representing the object image;
 (c) an automatic focusing system of a light beam projection type which projects a light beam toward the object and automatically focuses said lens system on the object on the basis of the reflected light beam coming from the object, said focusing system including a light sensor with a pair of sensor sections and detecting the focus of the lens system by the comparison of output signals of the sensor sections;
 (d) compensation signal generation means for generating, on the basis of the image signal generated by said image pick-up means, a compensation signal depending upon the difference in light reflecting conditions of two portions of the object which are illuminated with the light beam projected by said focusing system and substantially correspond to the fields of views of the sensor sections of said light sensor, respectively; and
 (e) compensation means for compensating a focus detection signal of said focusing system with the compensation signal generated by said compensation signal generation means.

17. The camera according to claim 16, wherein said focusing system is arranged to project a light beam of a predetermined characteristic; said image pick-up means is arranged to generate an image signal including a signal component representing a light component which has a characteristic approximated to that of the light beam projected by said focusing system; and said compensation signal generation means is arranged to generate said compensation signal on the basis of said signal component of the image signal generated by said image pick-up means.

18. The camera according to claim 17, wherein said characteristic includes a wave length of the light.

19. The camera according to claim 18, wherein said focusing system is arranged to project an infrared beam; said image pick-up means is arranged to generate the signal component representing red light; and said compensation signal generation means is arranged to generate the compensation signal on the basis of the signal component representing the red light.

20. The camera according to claim 17, wherein said compensation signal generation means includes:
 signal gate means;
 gate control means for causing said gate means to select from the signal component of the image signal a signal component portions substantially corresponding to the portions of the object which are illuminated by the light beam projected by said focusing system and substantially correspond to the fields of views of the sensor sections of said light sensor, respectively; and
 circuit means for producing said compensation signal by processing the signal component portions selected by said gate means.

* * * * *